Aug. 25, 1942.                J. M. NAUL                2,293,996
                   SPEED GOVERNOR FOR ELECTRIC MOTORS
                          Filed Nov. 14, 1939
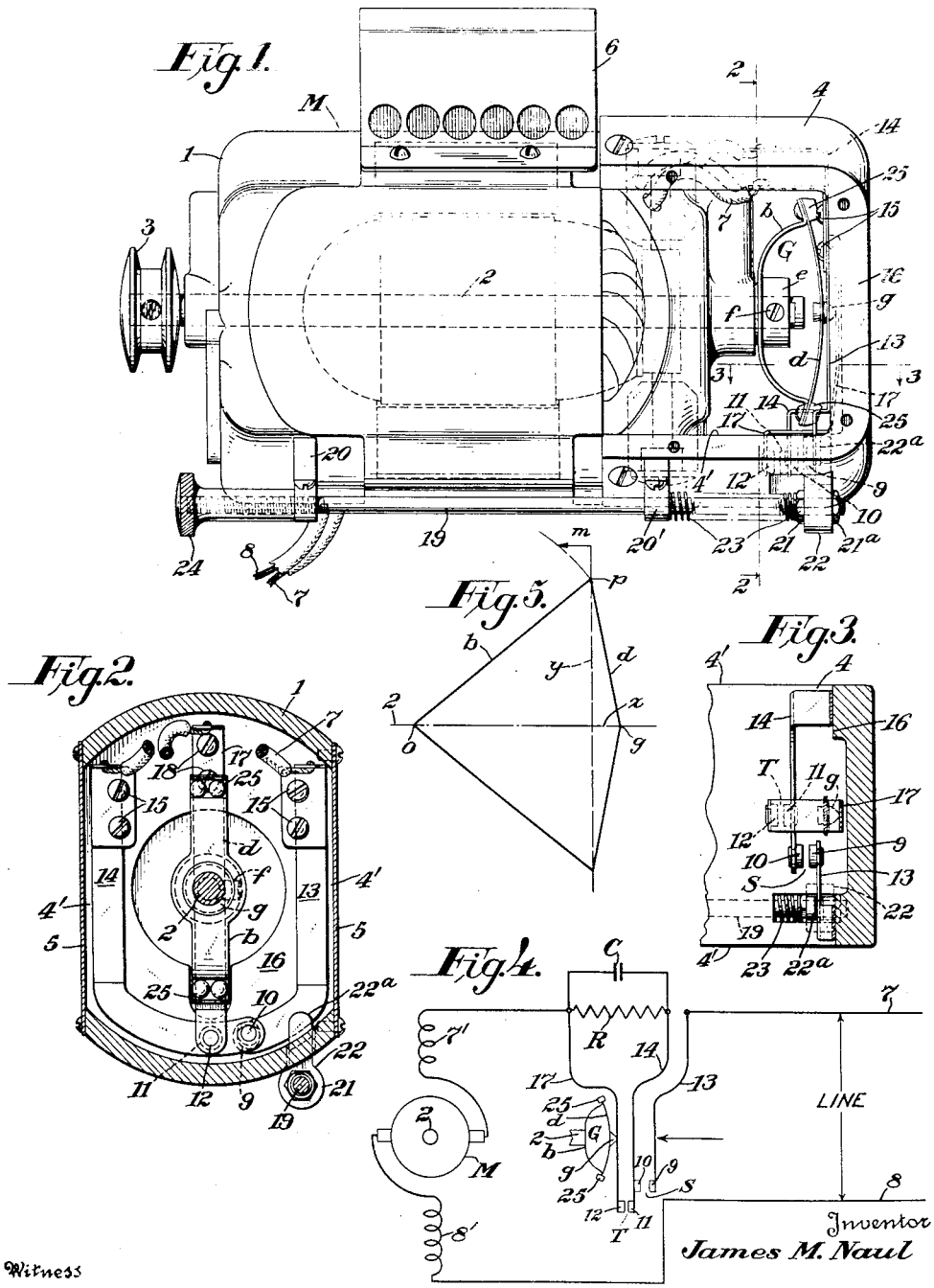
Witness
John N. Cave
Inventor
James M. Naul
By Henry J. Miller
Attorney Patented Aug. 25, 1942

2,293,996

UNITED STATES PATENT OFFICE 2,293,996

SPEED GOVERNOR FOR ELECTRIC MOTORS

James M. Naul, Fanwood, N. J., assignor to The Singer Manufacturing Company, Elizabeth, N. J., a corporation of New Jersey Application November 14, 1939, Serial No. 304,292

8 Claims. (Cl. 200—80)

This invention relates to speed governors for electric motors, and more particularly to that type of speed governor which acts, through centrifugal force, to open the electric circuit to the motor when a predetermined maximum speed has been attained and to close the circuit when the motor speed falls below that predetermined maximum.

Speed governors of this general nature are broadly old but it is an object of this invention to improve this old type of governor by making it more sensitive to variations in speed so that a more constant motor speed may be maintained, even at low speeds.

This has been attained by the provision of an improved speed-responsive member, hereinafter called the governor, mounted on the motor shaft and adapted automatically to open and close the motor circuit to maintain the desired motor speed. This improved governor comprises two elements, of which one is actuated by centrifugal force and the other of which is connected to and actuated by the first and adapted to control the motor circuit.

The construction of this governor is an important feature of this invention inasmuch as it is by means of this specific construction that the governor is rendered more sensitive to variations in speed than governors heretofore provided. Preferably, this improved governor comprises one deeply bowed spring element secured upon the motor shaft and one slightly bowed element, connected chord-like to the free ends of the first named element, and carrying at its mid-portion, in line with the axis of the motor shaft, a button adapted, by axial movement, to effect making and breaking of the motor circuit. The two bowed elements of the governor are so constructed and arranged that a small increment of radial movement of the centrifugally actuated member effects a materially greater axial movement of the other member, thus rendering the circuit-controlling element extremely sensitive to slight variations in motor speed. If desired, one or both of the two elements of the governor may be made in the form of pivotally connected arms, instead of spring elements as shown.

Another object of the invention is to provide, in a single unit, an electric motor, speed-governing means therefor and manually actuable means for controlling the action of the speed governor.

With the above and other objects in view, as will hereinafter appear, the invention comprises the devices, combinations and arrangements of parts hereinafter described in connection with the accompanying drawing which illustrates a preferred embodiment of the invention.

In the drawing,

Figure 1 is a side elevation of an electric motor embodying the present invention, with a cover-plate thereof removed.

Figure 2 is a transverse section on the line 2—2 of Fig. 1.

Figure 3 is a horizontal section substantially on the line 3—3 of Fig. 1.

Figure 4 is a diagrammatic illustration of a motor-driving electric circuit embodying the present improved speed governor, and Figure 5 is a diagrammatic illustration of the improved governor.

Referring more specifically to the drawing, the invention is disclosed as embodied in an electric motor M comprising a casing 1 which houses the usual field frame, field coils and other elements common to electric motors, including an armature shaft 2 which carries a pulley 3 adapted to drive any suitable mechanism. At one end, the motor casing is extended beyond its usual length, as indicated at 4, to form a housing for the improved speed-responsive governor, which is designated generally as G. The opposite side walls of the extension 4 are provided with openings 4' adapted to give access to the governor and these openings are normally closed by side cover-plates 5, as shown in Fig. 2. A resistor R and an arc-suppressing condenser C, illustrated in Fig. 4, are housed within a casing 6 secured to the upper side of the motor casing.

Before describing the improved speed governor a brief description will be given of the motor-driving electric circuit in which the governor is embodied. This circuit is illustrated in Fig. 4 and comprises line wires 7 and 8 adapted to be connected together through the field coils 7', 8' of the motor M. Embodied in the line 7 is a line switch S comprising contacts 9 and 10 of which the latter is connected to the field coil 7' through the resistor R, across which is connected the arc-suppressing condenser C. When the line switch only is closed, current flows from the line 7 through the motor M, but in an amount insufficient to effect rotation of the motor, due to the action of the resistor R. Cooperating with the line switch S is a speed governor switch T comprising contacts 11 and 12 of which the former is connected to the contact 10 of the line switch and the latter is connected with the field coil 7' behind the resistor R. When both the line switch and the governor switch have been closed, full current flows from the line 7 to the motor without passing through the resistor, thereby tending to rotate the motor at full speed. When a predetermined speed has been attained, as determined by a setting of the contact 11, centrifugal force acting on the governor G causes contacts 11 and 12 to be opened, whereupon current flows to the motor through the resistor, thereby causing the motor speed to be reduced. Deceleration of the motor causes the governor again to close the contacts 11 and 12 to effect acceleration of the motor. This continuous acceleration and deceleration of the motor tends to hold the motor speed at a substantially constant predetermined rate. Obviously, the more sensitive is the governor G the more nearly constant will the motor speed be maintained.

The contacts 9 and 10 of the line switch are preferably carried by spring-arms 13 and 14, respectively, secured, by screws 15, to the inner face of the end wall 16 of the motor housing extension 4. The arm 14 also carries the contact 11 of the governor switch, while the other contact, 12, of the governor switch is carried by a light spring-arm 17 secured to the end wall 16 by screws 18.

The line switch S and the governor switch T may be closed by any suitable mechanism, to cause the motor to run. One suitable means for this purpose is illustrated in the drawing, but it is to be understood that various other means are contemplated. As shown in the drawing, the switch-actuating means comprises a rod 19 slidingly mounted in bearing-brackets 20 and 20' secured to the motor casing. Secured to one end of the rod 20, by nuts 21, 21a, is an arm 22 of insulating material, the upper bifurcated end 22a of which extends into the governor housing and straddles the contact-carrying arm 13. Surrounding the rod 19 between the bracket 20' and the nut 21, is a coil-spring 23 which tends to shift the rod 19 and, through the arm 22, the contact carrying arm 13, to the right as seen in Fig. 1 thereby to open the line switch and to permit the governor switch to open under spring action. On the opposite end of the rod 19 is threaded a thumb-nut 24 which bears against the bearing-bracket 20 and serves, upon rotation, to shift the rod 19 and its switch-actuating arm 22 to the left, in opposition to the spring 23, to close the line and governor switches.

The improved governor preferably comprises two interconnected bowed springs b and d of which b is attached to a collar e secured upon the armature shaft 2 by set-screw f. Spring b is relatively stiff and of smaller radius than spring d. The springs b and d are secured together at their ends and may carry, at their juncture, suitable weights 25 adapted to be shifted outwardly under centrifugal force during rotation of the motor. Under certain conditions the centrifugal action on the element b may suffice and the weights may be dispensed with. At its mid-portion, in line with the axis of the shaft 2, the spring d carries a button g of insulating material, adapted to act upon the contact arm 17, in opposition to the spring-tension of the latter, to control the opening and closing of the contacts 11 and 12 in the motor circuit.

As hereinbefore stated, an object of this invention is to provide a governor which is more sensitive to variations in speed than governors heretofore provided. This has been attained by the specific construction of the governor shown in Fig. 1 and illustrated diagrammatically in Fig. 5, which produces a relatively large axial movement of the point g by a relatively small combined radial and axial movement of the point p at which the element b and d are connected together.

As illustrated in Figs. 1 and 5, the spring element b is deeply bowed, or in other words curved on a relatively short radius, while the element d is relatively flat, being curved on a materially larger radius.

The sensitivity of axial motion of g to radial motion of p is a function of the ratio of the distance y over the distance x in Fig. 5. Thus, if the length of y is four times the length of x the axial motion of g will be four times the radial motion of p, plus the axial component of the point p about its center o, as represented by the line m. The axial motion of the point g is substantially doubled at the contact 12 due to the fact that the point g engages the arm 17 substantially midway between its point of connection with the end wall 16 (which point serves as a fulcrum) and the contact 12. Thus the sensitivity of the governor is further increased.

The action of the governor is as follows: Rotation of the shaft 2 causes point p to move both radially and axially. Because of the relatively flat curvature of the element d, the combined movement is multiplied greatly at the point g. Thus a small increment of movement of the point p causes the contact 12 to move away from contact 11. With these contacts open the resistor R is in series with the motor which causes a reduction in motor speed. This reduction in speed in turn reduces the centrifugal action on the weights 25 and the contacts 11, 12 are again closed. This cuts out the resistance R and the motor again tends to operate the maximum speed. This control action is so fast that no change of motor speed is noticeable. It will be understood that the speed to which the motor will advance before the contacts 11 and 12 are opened by the centrifugal action of the governor is dependent upon the lateral position to which the contacts are shifted by the manual control including the nut 24 and rod 19. The further the contacts 11 and 12 are moved to the left, as seen in Figs. 1 and 4, the higher must be the motor speed to withdraw the point g from the arm 17 to permit those contacts to open. If the contacts are shifted to a point beyond the range of movement of the point g the contacts will remain closed and the motor will run at full speed.

It will be noted that, inasmuch as the elements of the governor and the control switches are light in weight, and substantially devoid of friction, they are supersensitive to changes in speed.

Having thus set forth the nature of the invention, what I claim herein is:

1. A governor for an electric motor having a rotary shaft, comprising a pair of unequally and oppositely bowed spring elements rotatable with said shaft and rigidly secured together adjacent both ends thereof, an electric circuit connected with said motor and including a switch, and means actuated by the lesser bowed one of said elements, by the combined radial and axial movement of the other element under centrifugal force, for opening said switch.

2. A speed-responsive governor for a make-and-break electric switch comprising, a rotary shaft, a centrifugally actuated bow-spring mounted at its mid-portion on one end of said shaft, and switch-governing means including a member bowed oppositely to said bow-spring, said member being rigidly secured to free ends of said bow-spring and actuated thereby, the mid-portion of said switch-governing means being spaced from a straight line joining the free ends of said bow-spring a distance less than the distance from said line to the mid-portion of said bow-spring.

3. A speed-responsive governor for a make-and-break electric switch comprising, a rotary shaft, a centrifugally actuated bow-spring mounted at its mid-portion on one end of said shaft, and switch-governing means including a flexible member bowed oppositely to said bow-spring, said member being rigidly secured to the free ends of said bow-spring and actuated thereby, the mid-portion of said switch-governing means being spaced from a straight line joining the free ends of said bow-spring a distance less than the distance from said line to the mid-portion of said bow-spring, said bow-spring and switch-governing means being disposed on opposite sides of said line.

4. A speed-responsive governor for a make-and-break electric switch comprising a rotary shaft, a resilient member connected at its mid-portion with said shaft and having outwardly and forwardly extending arms, and a switch governing means, having a switch actuating portion, rigidly and permanently connecting the free ends of said arms, said resilient member and said switch governing means being located at opposite sides of a straight line connecting the free ends of said member the switch-actuating portion of said switch-governing means being spaced from said straight line a distance materially less than the distance from said line to the point at which said arms are connected to said shaft, whereby said switch-actuating portion is given major movements axially of said shaft by minor radial movements of the outer ends of said arms.

5. A governor for an electric motor having a rotary shaft, comprising a pair of oppositely bowed centrifugally actuated spring elements rotatable with said shaft and rigidly secured together adjacent their ends, said elements having materially unequal radii of curvature, and a switch-actuating element carried by the one of said elements having the greater radius of curvature.

6. A governor for an electric motor having a rotary shaft, comprising a pair of oppositely and unequally bowed spring elements rotatable with said shaft and rigidly secured together adjacent their ends, weights carried at the connected ends of said elements, and means actuated by the lesser bowed one of said elements by the radial and axial movement of the other element, under the centrifugal force of said weights, for actuating an electric switch.

7. A governor for an electric motor having a rotary shaft, comprising a deeply bowed spring element secured to and rotatable with said shaft and a less deeply and oppositely bowed spring element having its free ends rigidly and permanently connected to the free ends of the first named element, the outer ends of the first named element being movable radially and axially of said shaft by centrifugal force, and the mid-portion of the second named element being moved axially of said shaft a materially greater extent by the combined radial and axial movement of the first named element, and switch-actuating means carried by the mid-portion of said second named element.

8. A governor for an electric motor having a rotary shaft, comprising a deeply bowed relatively stiff spring element rotatable with said shaft and a less deeply and oppositely bowed spring element rigidly secured at its opposite ends to the first named element and adapted to be given major movements axially of said shaft by minor radial movements of the first named element under centrifugal force, and switch-controlling means actuated by the mid-portion of the second named element.

JAMES M. NAUL.